United States Patent
Takahashi

(10) Patent No.: US 10,549,651 B2
(45) Date of Patent: Feb. 4, 2020

(54) MOBILE BODY AND MOBILE BODY SYSTEM

(71) Applicant: Nidec Corporation, Kyoto (JP)

(72) Inventor: Hirotaka Takahashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/098,892

(22) PCT Filed: Feb. 28, 2017

(86) PCT No.: PCT/JP2017/007839
§ 371 (c)(1),
(2) Date: Nov. 5, 2018

(87) PCT Pub. No.: WO2017/208546
PCT Pub. Date: Dec. 7, 2017

(65) Prior Publication Data
US 2019/0193583 A1    Jun. 27, 2019

(30) Foreign Application Priority Data
May 31, 2016 (JP) .................................. 2016-108547

(51) Int. Cl.
*B60L 53/00* (2019.01)
*H02J 50/00* (2016.01)
(Continued)

(52) U.S. Cl.
CPC ............. *B60L 53/126* (2019.02); *B60L 15/20* (2013.01); *B60L 50/50* (2019.02); *B60M 7/00* (2013.01);
(Continued)

(58) Field of Classification Search
None
See application file for complete search history.

(56) References Cited

U.S. PATENT DOCUMENTS 9,132,739 B2 * 9/2015 Niizuma ............... B60L 53/30
2011/0153081 A1   6/2011 Romanov et al.
2014/0257614 A1   9/2014 Niizuma

FOREIGN PATENT DOCUMENTS

JP    04-53515 A      2/1992
JP    2008-137451 A   6/2008
(Continued)

OTHER PUBLICATIONS

Official Communication issued in International Patent Application No. PCT/JP2017/007839, dated May 23, 2017.

*Primary Examiner* — Leigh M Garbowski
(74) *Attorney, Agent, or Firm* — Keating & Bennett

(57) ABSTRACT

A mobile body is driven by power that is wirelessly transferred from a non-contact power supply device including a power transmission resonator that transmits power in accordance with a non-contact power supply method. The mobile body includes a power reception resonator, a power storage, a motor, a controller, and at least two wheels driven independently of each other by the motor, the at least two wheels including a first movement axis and a second movement axis with an axial orientation different from that of the first movement axis, and moving the mobile body along the first movement axis and the second movement axis. When the mobile body moves to a power supply target range, the controller controls the motor based on power reception status information indicating a status of power reception by the power reception resonator, and moves in a flat plane direction.

13 Claims, 12 Drawing Sheets

(51) Int. Cl.
*B60L 53/126* (2019.01)
*G05D 1/02* (2006.01)
*B60M 7/00* (2006.01)
*B60L 15/20* (2006.01)
*B60L 50/50* (2019.01)
*H02J 50/90* (2016.01)
*H02J 50/12* (2016.01)
*H02J 7/02* (2016.01)

(52) U.S. Cl.
CPC ................ *G05D 1/02* (2013.01); *H02J 7/025* (2013.01); *H02J 50/12* (2016.02); *H02J 50/90* (2016.02); *Y02T 10/7005* (2013.01); *Y02T 10/7275* (2013.01)

(56) References Cited

FOREIGN PATENT DOCUMENTS

| | | |
|---|---|---|
| JP | 2012-10551 A | 1/2012 |
| JP | 2013-169109 A | 8/2013 |
| JP | 2013-187934 A | 9/2013 |
| JP | 2014-96947 A | 5/2014 |

\* cited by examiner

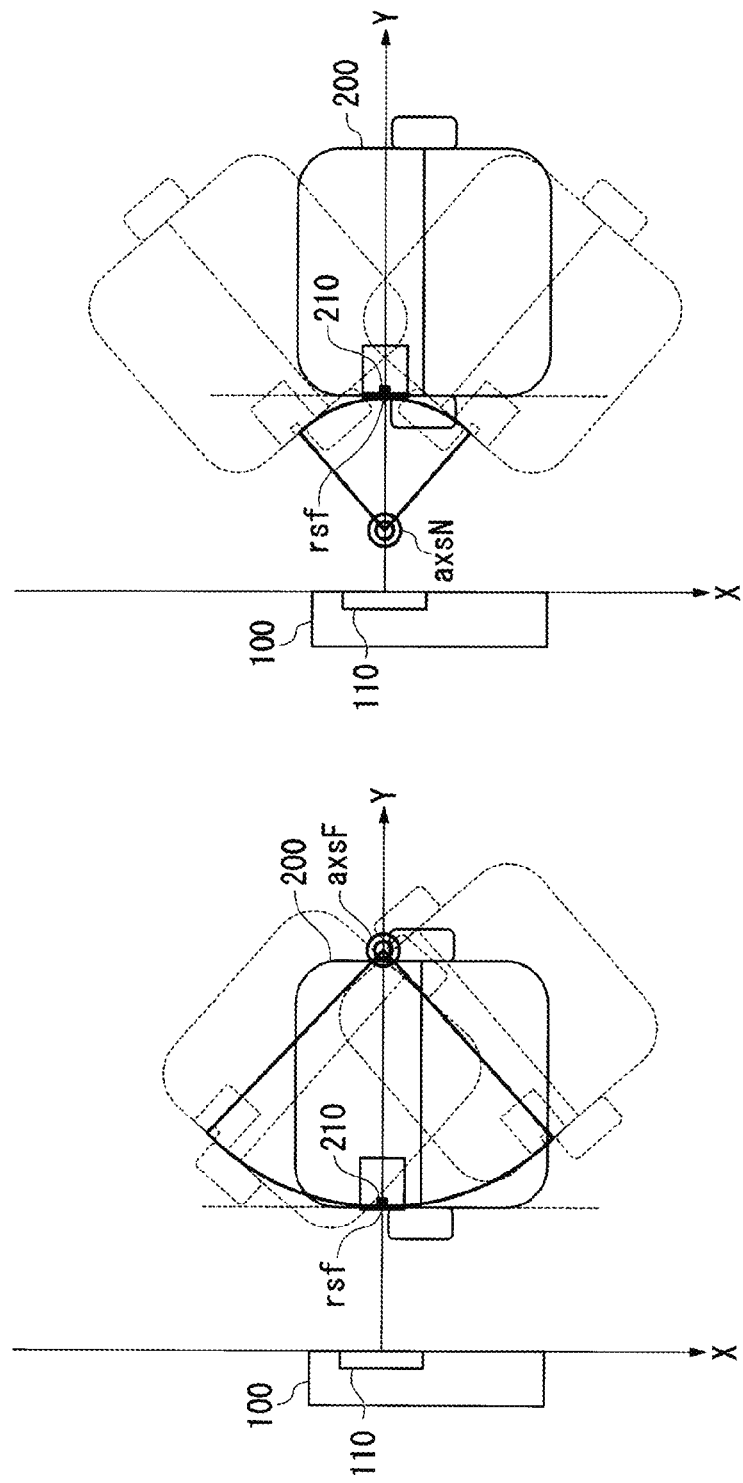

MOBILE BODY AND MOBILE BODY SYSTEM

BACKGROUND OF THE INVENTION

1. Field of the Invention

The present disclosure relates to a mobile body and a mobile body system.

2. Description of the Related Art

In a known system of an automatic guided vehicle, a system for non-contact power supply to an automatic guided vehicle is known.

When a mobile body such as an automatic guided vehicle receives power supply in accordance with a non-contact power supply method, the power supply is conducted by transmitting and receiving power between a power transmission resonator provided to a non-contact power supply device on a power transmission side and a power reception resonator provided to the mobile body on a power reception side. Here, when the power is transmitted and received between the power transmission resonator and the power reception resonator, power supply efficiency varies depending on relative positions and orientations between the power transmission resonator and the power reception resonator. Accordingly, depending on the relative positions and orientations between the power transmission resonator and the power reception resonator, that is, depending on the position and the orientation of the mobile body relative to those of the non-contact power supply device, the mobile body may face a difficulty in receiving the power supply efficiently.

SUMMARY OF THE INVENTION

An exemplary embodiment of the present disclosure provides a mobile body to be driven by power that is wirelessly transferred from a non-contact power supply device including a power transmission resonator to transmit the power in accordance with a non-contact power supply method. The mobile body includes a power reception resonator to receive the power transmitted from the power transmission resonator; a power storage to store the power received by the power reception resonator; a motor to be operated by the power stored in the power storage; a controller configured or programmed to control driving of the motor; and at least two wheels to be driven independently of each other by the motor, the at least two wheels including a first movement axis and a second movement axis with an axial orientation being different from an axial orientation of the first movement axis, and the at least two wheels move the mobile body along the first movement axis and the second movement axis. The at least two wheels are movable on a floor surface. When the mobile body moves to a power supply target range, the controller controls the motor based on power reception status information indicating a status of power reception by the power reception resonator, and moves in a flat plane direction.

According to the exemplary embodiment of the present disclosure, a mobile body and a mobile body system enable the mobile body to move based on a status of power reception from a power transmission resonator.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIGS. 12A and 12B are diagrams showing an example of a layout of a power reception surface and the rotation axis of a mobile body of an exemplary embodiment of the present disclosure.

DETAILED DESCRIPTION OF THE PREFERRED EMBODIMENTS

Exemplary embodiments of the present disclosure will be described below with reference to the drawings. First of all, an outline of a mobile body 200 will be described with reference to FIG. 1.

Figure 1:
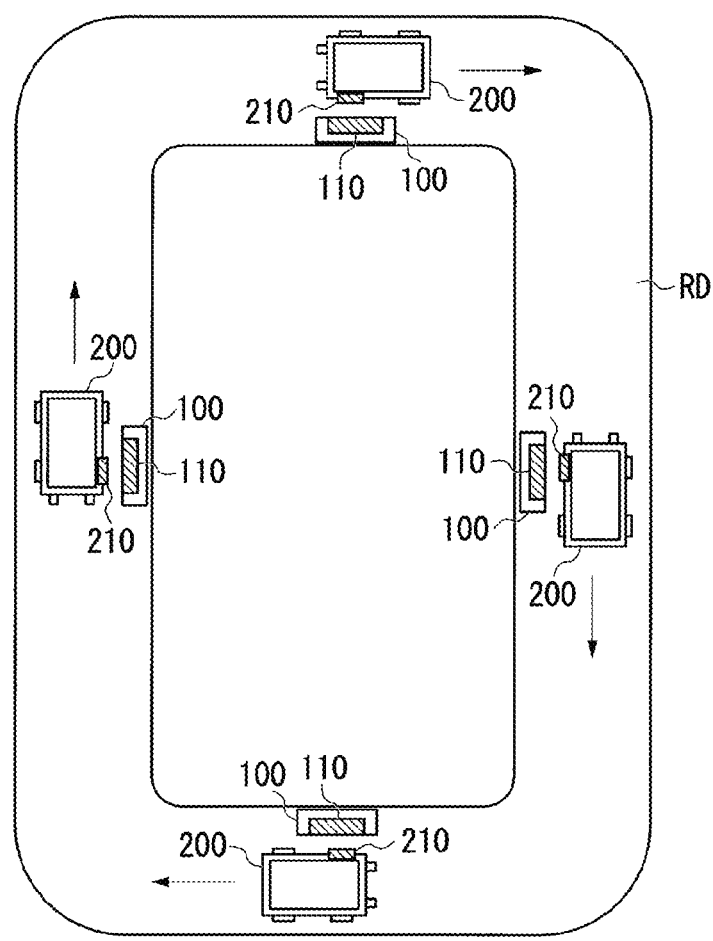
FIG. 1 is a diagram showing an example of a configuration of a mobile body system of an exemplary embodiment of the present disclosure.

FIG. 1 is a diagram showing an example of a configuration of a mobile body system 1 of this embodiment. The mobile body system 1 includes mobile bodies 200 and non-contact power supply devices 100. Each mobile body 200 is an AGV (automatic guided vehicle) that moves in a factory or in a hospital, for example. In this example, each mobile body 200 moves along a guided track RD. Each non-contact power supply device 100 supplies power to one of the mobile bodies 200 in accordance with a non-contact power supply method. In this example, each non-contact power supply device 100 is installed in the vicinity of the guided track RD. Each mobile body 200 moves along the guided track RD and consumes the power as a consequence of the movement. When the mobile body 200 moves to a position where the non-contact power supply device 100 is installed, the mobile body 200 receives power supply from the non-contact power supply device 100. That is to say, the mobile body 200 is driven by the power wirelessly transmitted from the non-contact power supply device 100.

Control of a start of power supply and a stop of the power supply takes place between the non-contact power supply device 100 and the mobile body 200 by means of communication. Here, the communication is optical communication, for instance. In this example, when the mobile body 200 arrives in a power supply target range OPS, the mobile body 200 transmits a power supply start request to the non-contact power supply device 100. Upon receipt of the power supply start request from the mobile body 200, the non-contact power supply device 100 starts wireless power transfer to a power supply range RPS. Meanwhile, when a power supply stop condition is met, such as when an amount of power supply reaches a target value, the mobile body 200 transmits a power supply stop request to the non-contact power supply device 100. Upon receipt of the power supply stop request from the mobile body 200, the non-contact power supply device 100 stops the wireless power transfer.

Figure 2:
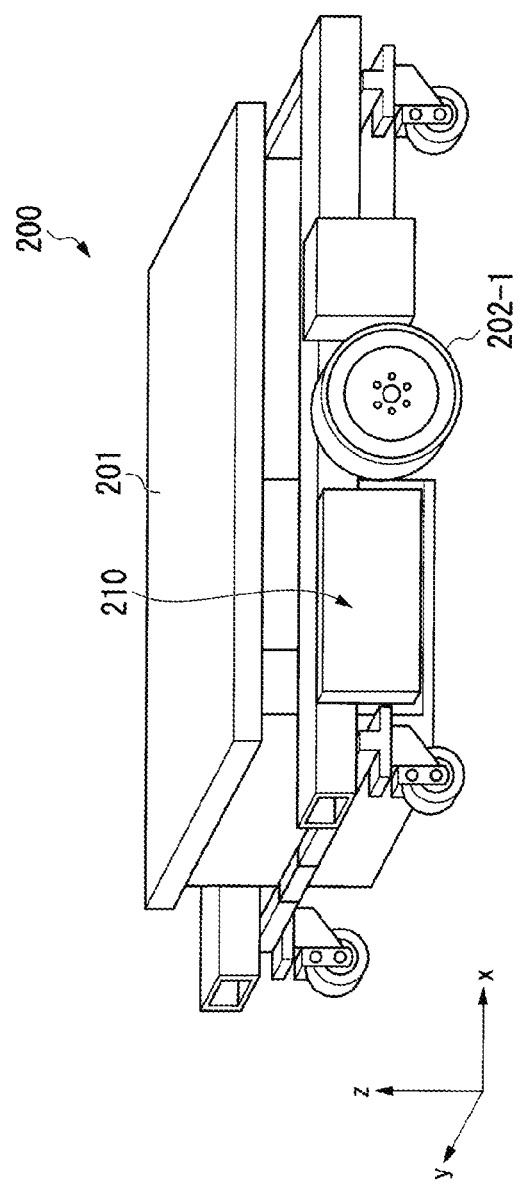
FIG. 2 is a diagram showing an example of an external configuration of a mobile body of an exemplary embodiment of the present disclosure.
Figure 3:
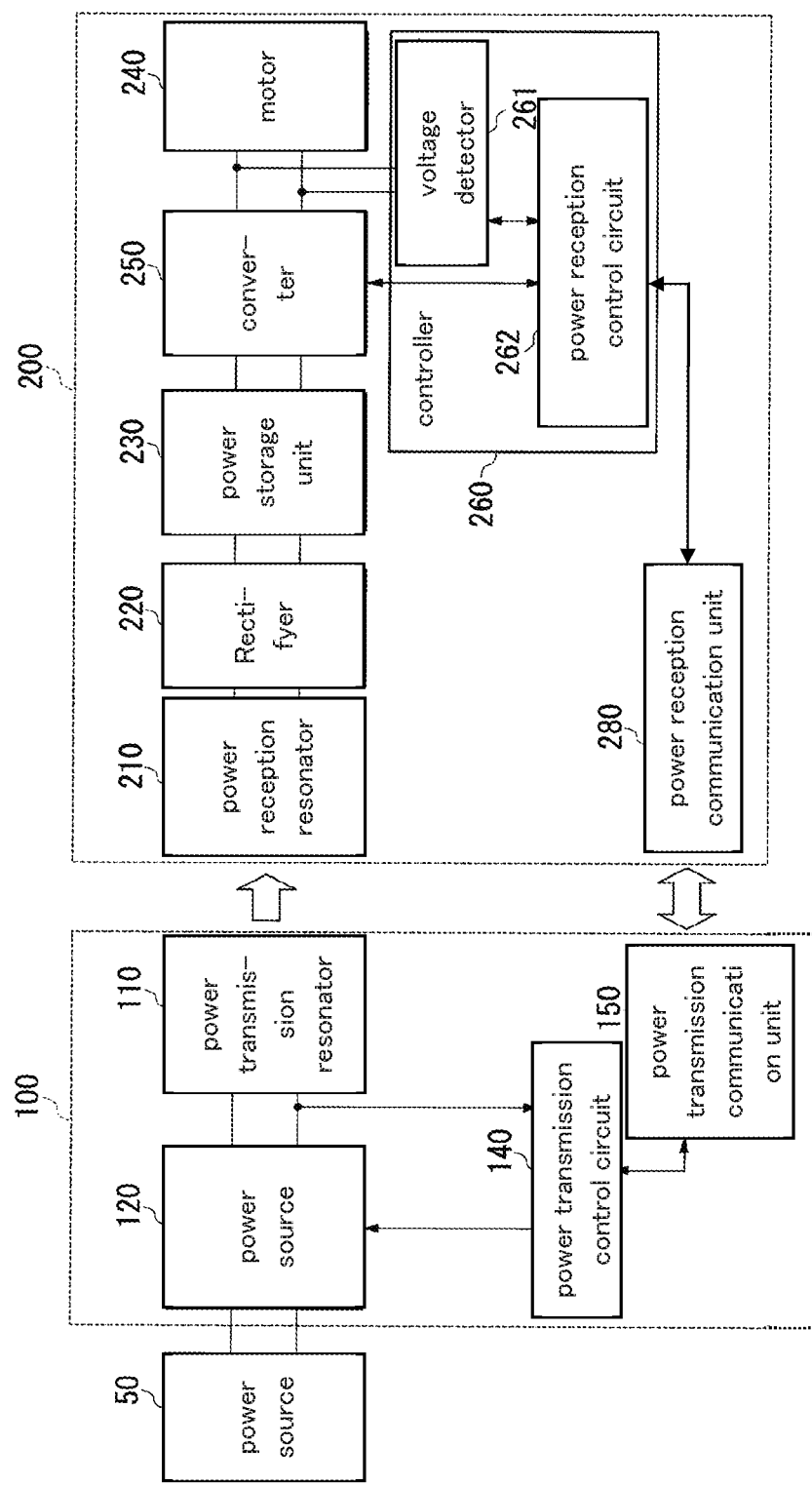
FIG. 3 is a diagram showing an example of functional configurations of a non-contact power supply device and a mobile body of an exemplary embodiment of the present disclosure.
Figure 4:
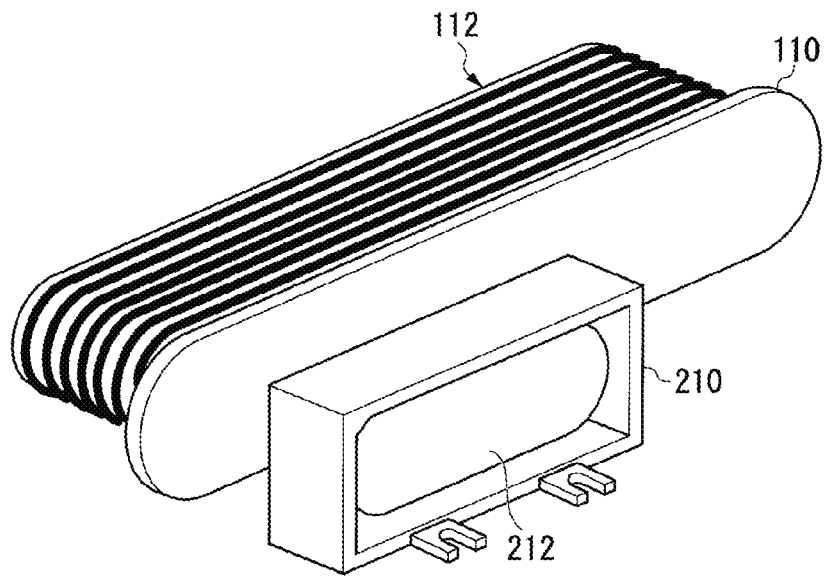
FIG. 4 is a diagram showing an example of a layout relation between a power transmission resonator and a power reception resonator of an exemplary embodiment of the present disclosure.

Specific configuration examples of the non-contact power supply device 100 and the mobile body 200 are shown in FIGS. 2 to 4. FIG. 2 is a diagram showing an example of an external configuration of the mobile body 200 of this embodiment. The mobile body 200 includes a loading platform 201, wheels 202, and a power reception resonator 210. If the coordinates of the mobile body 200 need to be specified in the following description, the coordinates will be described by using an xyz orthogonal coordinate system. In the xyz orthogonal coordinate system, an xy-plane is parallel to a movement plane (such as a floor surface) of the mobile body 200. The z-axis indicates the vertical direction. The x-axis indicates a traveling direction of the mobile body 200. The y-axis direction indicates a direction orthogonal to the traveling direction of the mobile body 200. In this example, the x-axis is parallel to a direction of a long side of the loading platform 201. The y-axis is parallel to a direction of a short side of the loading platform 201. A positive direction on the x-axis is also referred to as a forward movement direction of the mobile body 200. Meanwhile, a negative direction on the x-axis is also referred to as a backward movement direction of the mobile body 200. In other words, the x-axis represents the forward and backward movement directions of the mobile body 200.

An item as a target for conveyance by the mobile body 200 is loaded on the loading platform 201. Examples of such a conveyance target item include a product manufactured in a factory as well as a component, a jig, a tool and the like used for forming such a product. The wheels 202 are driven by a motor 240. In this example, the wheels 202 include a wheel 202-1 and a wheel 202-2. The wheel 202-1 and the wheel 202-2 are arranged away from each other in the y-axis direction, that is, a right-left direction of the mobile body 200. The mobile body 200 moves as a consequence of driving the wheel 202-1 and the wheel 202-2. Moreover, the mobile body 200 steers its traveling direction by driving the wheel 202-1 and the wheel 202-2 at different rotational speeds from each other. Furthermore, the mobile body 200 performs rotational movement, that is, turns around the center position of the mobile body 200 serving as the rotational center by driving the wheel 202-1 and the wheel 202-2 in different rotational directions from each other. In other words, the mobile body 200 includes at least two wheels 202 that are driven independently from each other. Moreover, the wheels 202 have a steering axis in the z-axis direction. Specifically, when the wheels 202 are steered in the x-axis direction, the mobile body 200 can move in the positive and negative directions on the x-axis. Meanwhile, when the wheels 202 are steered in the y-axis direction, the mobile body 200 can move in the positive and negative directions on the y-axis. In the following description, if the wheel 202-1 and the wheel 202-2 need not be distinguished from each other, then each wheel will be referred to as the wheel 202.

FIG. 3 is a diagram showing an example of functional configurations of the non-contact power supply device 100 and the mobile body 200 of this embodiment. The non-contact power supply device 100 includes a power transmission resonator 110, an inverter circuit 120, a power transmission control circuit 140, and a power transmission communication unit 150. The inverter circuit 120 outputs power supplied from a DC power source 50 to the power transmission resonator 110 based on the control of the power transmission control circuit 140. Although this example describes a case where the power source of the non-contact power supply device 100 is the DC power source 50, the present disclosure is not limited to this configuration. For instance, the power source of the non-contact power supply device 100 may be an alternating-current source such as a commercial power source.

The power transmission resonator 110 transmits the power to the power reception resonator 210 in accordance with the non-contact power supply method.

The power transmission communication unit 150 includes an infrared sensor and the like, for instance, and receives communication infrared light emitted from a power reception communication unit 280 of the mobile body 200.

Alternatively, the power transmission communication unit 150 may emit communication infrared light to the power reception communication unit 280 of the mobile body 200. The power transmission control circuit 140 controls the power supply by the power transmission resonator 110 based on the infrared light received by the power transmission communication unit 150.

The mobile body 200 includes the power reception resonator 210, a rectifier 220, a power storage 230, the motor 240, a DC-DC converter 250, a controller 260, and the power reception communication unit 280. Meanwhile, the controller 260 includes a voltage detector 261 and a power reception control circuit 262.

The power reception resonator 210 receives the power supplied from the power transmission resonator 110. A relation of layout positions between the power transmission resonator 110 and the power reception resonator 210 will be described with reference to FIG. 4.

FIG. 4 is a diagram showing an example of a layout relation between the power transmission resonator 110 and the power reception resonator 210 of this embodiment. The power transmission resonator 110 includes a power transmission coil 112. The power reception resonator 210 includes a power reception coil 212.

If the coordinates of the non-contact power supply device 100 need to be specified in the following description, the coordinates will be described by using the XYZ orthogonal coordinate system. A power transmission surface of the power transmission resonator 110 of the non-contact power supply device 100 is located opposite to a power reception surface of the power reception resonator 210. The direction to locate the power transmission surface of the power transmission resonator 110 and the direction to locate the power reception surface of the power reception resonator 210 can be selected from various options depending on the form of the non-contact power supply device 100 and the form of the mobile body 200. For example, the mobile body 200 may be provided with the power reception surface of the power reception resonator 210 on a bottom surface thereof. In this case, the power transmission surface of the power transmission resonator 110 is installed on a surface opposed to the bottom surface of the mobile body 200, or more specifically, buried in a floor surface, for example. Meanwhile, the mobile body 200 may be provided with the power reception surface of the power reception resonator 210 on a side surface thereof. In this case, the power transmission surface of the power transmission resonator 110 is installed on a surface opposed to the side surface of the mobile body 200, or more specifically, on a side surface of the non-contact power supply device 100, for example. The following description will be given of the example in which the power reception surface of the power reception resonator 210 is located on the side surface of the mobile body 200 and the power transmission surface of the power transmission resonator 110 is located on the side surface of the non-contact power supply device 100. In the case of this example, the XY-plane in the XYZ orthogonal coordinate system is a plane on which the mobile body 200 moves by using the wheels 202, that is, the plane parallel to the floor surface. On the other hand, the X-axis indicates a direction parallel to the power transmission surface of the power transmission resonator 110. It is also possible to say that the X-axis indicates a direction of a long side of the power transmission coil 112. The Y-axis indicates a direction orthogonal to the power transmission surface of the power transmission resonator 110. The direction orthogonal to the power transmission surface of the power transmission resonator 110 represents a direction of the highest power transmission energy density by the power transmission coil 112. In other words, the Y-axis represents a principal direction of the power transmission by the power transmission coil 112. The Z-axis indicates the vertically upward direction.

The power transmission coil 112 includes a conductor line (winding) which is wound such that the conductor line becomes relatively long in the X direction and relatively short in the Z direction. Likewise, the power reception coil 212 in the power reception resonator 210 also includes a conductor line (winding), which is wound such that the conductor line becomes long in the x direction and short in the z direction. In this embodiment, the shape and size of the power transmission coil 112 are different from those of the power reception coil 212 as shown in FIG. 4. In this embodiment, the size of a region defined by the winding of the power reception coil 212 is smaller than the size of a region redefined by the winding of the power transmission coil 112. The power transfer takes place in a state where the power transmission coil 112 and the power reception coil 212 are opposed to each other. To be more precise, electric charge takes place in a state where a plane defined by the winding of the power transmission coil 112 and a plane defined by the winding of the power reception coil 212 are opposed to each other. Note that it is possible to perform the electric charge not only in the case where these planes are perfectly parallel to each other but also in the case where the planes are inclined relative to each other. Moreover, since the power transmission coil 112 has such a shape that is elongated in the X direction, the state of the coils being opposed to each other is maintained even when the mobile body 200 is slightly displaced in the X direction. Therefore, the power transfer can be kept at high efficiency.

As shown in FIG. 3, the rectifier 220 rectifies the alternating-current power received by the power reception resonator 210, and supplies the rectified power to the power storage 230. The power storage 230 stores the power received by the power reception resonator 210. Meanwhile, the power storage 230 supplies the stored power to the DC-DC converter 250.

The DC-DC converter 250 feeds the power supplied from the power storage 230 to the motor 240 based on the control of the controller 260. Specifically, the DC-DC converter 250 feeds the power supplied from the power storage 230 to the motor 240 based on the control of the power reception control circuit 262. The motor 240 drives the wheels 202 by using the supplied power. The supplied power is the power stored in the power storage 230. In other words, the motor 240 moves the mobile body 200 by using the power stored in the power storage 230. The controller 260 includes the voltage detector 261 and the power reception control circuit 262. The controller 260 controls the power supply by the DC-DC converter 250. Specifically, the voltage detector 261 detects a voltage of the power supplied to the motor 240. Meanwhile, the power reception control circuit 262 controls the power supply by the DC-DC converter 250 based on the voltage detected with the voltage detector 261. As described above, the controller 260 controls the power which the DC-DC converter 250 supplies to the motor 240. The controller 260 therefore controls the motor 240.

The power reception communication unit 280 includes a light source to emit the infrared light, and emits the infrared light based on the control of the power reception control circuit 262. Moreover, the power reception communication unit 280 receives the infrared light emitted from the power transmission communication unit 150. Meanwhile, the power reception control circuit 262 controls the power reception communication unit 280. Specifically, the power reception control circuit 262 outputs a power supply start request signal and a power stop request signal to the power reception communication unit 280. The power reception communication unit 280 sends the non-contact power supply device 100 the power supply start request signal and the power stop request signal outputted from the power reception control circuit 262. Although the case where the power transmission communication unit 150 receives the power supply start request signal and the power stop request signal from the power reception communication unit 280 has been described above, the present disclosure is not limited to this configuration. The power transmission communication unit 150 and the power reception communication unit 280 may perform the communication either constantly or at predetermined intervals. The controller 260 may receive from the power transmission communication unit 150 power reception status information R that indicates a state of power reception by the power reception resonator 210. Alternatively, the controller 260 may be equipped with the power reception communication unit 280. The mobile body 200 performs horizontal movement or rotational movement based on the power reception status information R received by the power reception communication unit 280. Specifically, the mobile body 200 moves as a consequence of the controller 260 controlling the motor 240 based on the power reception status information R indicating the state of power reception by the power reception resonator 210. In the following example, a description will be given of the case in which the power reception communication unit 280 sends the non-contact power supply device 100 the power supply start request signal and the power supply stop request signal outputted from the power reception control circuit 262.

Figure 5:
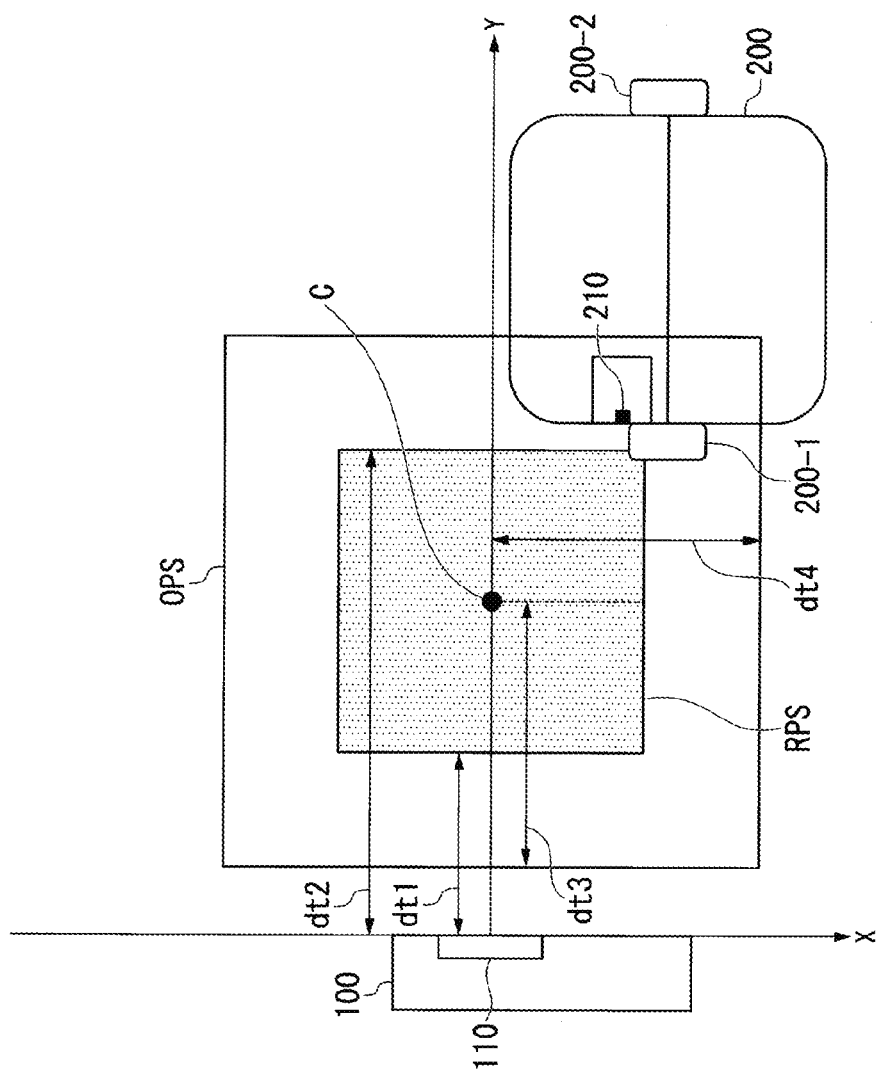
FIG. 5 is a diagram showing an example of a power supply target range and a power supply range of an exemplary embodiment of the present disclosure.

Relative positions among the non-contact power supply device 100, the mobile body 200, the power supply target range OPS, and the power supply range RPS will be described below with reference to FIG. 5. FIG. 5 is a diagram showing an example of the power supply target range OPS and the power supply range RPS of the embodiment. The power supply target range OPS is a range in which the mobile body 200 makes a stop in order to receive the power supply from the non-contact power supply device 100. The power supply range RPS is a range within the power supply target range OPS, in which the mobile body 200 can receive the power supply from the non-contact power supply device 100. In this example, the non-contact power supply device 100 is installed along the X-axis. Meanwhile, the power transmission resonator 110 of the non-contact power supply device 100 transmits the power while setting the Y-axis as the center axis of the power transmission.

Here, the mobile body 200 grasps the position of the power supply target range OPS but does not grasp the position of the power supply range RPS. That is to say, even when the mobile body 200 arrives in the power supply target range OPS, the mobile body 200 cannot determine whether or not the mobile body 200 is located in the power supply range RPS by using position coordinates. As a consequence, even when the mobile body 200 is located in the power supply target range OPS, the mobile body 200 may be unable to receive the power from the non-contact power supply device 100 or may confront lower power supply efficiency than a target value.

In the meantime, the efficiency of the power supply to the mobile body 200 varies depending on relative positions and orientations between the power transmission resonator 110 of the non-contact power supply device 100 and the power reception resonator 210 of the mobile body 200. Nonetheless, the mobile body 200 does not grasp the relative positions and orientations between the power transmission resonator 110 of the non-contact power supply device 100 and the power reception resonator 210. In other words, even when the mobile body 200 arrives in the power supply target range OPS, the mobile body 200 cannot determine by use of the position coordinates as to whether or not the relative positions and orientations between the power transmission resonator 110 and the power reception resonator 210 meet the positions and orientations that bring about the fine power supply efficiency.

Specifically, it may be difficult for the power reception resonator 210 to receive the power supply if the power reception resonator 210 is located close by less than a predetermined distance dt1 to the power transmission resonator 110. On the other hand, it may be difficult for the power reception resonator 210 to receive the power supply if the power reception resonator 210 is located away by more than a predetermined distance dt2 from the power transmission resonator 110.

The power supply range RPS is a range not close by less than the predetermined distance dt1 to the power transmission resonator 110 and not far by more than a predetermined distance dt3 away from the power transmission resonator 110. Meanwhile, the power supply target range OPS is a range including the power supply range RPS, which has dimensions of the predetermined distance dt3 in the X-axis direction away from the center C of the power supply range RPS and a predetermined distance dt4 in the Y-axis direction away from the center C. Here, the predetermined distance dt1, the predetermined distance dt2, the predetermined distance dt3, and the predetermined distance dt4 are distances based on a power transmission performance of the power transmission resonator 110.

An example of movement control of the mobile body 200 will be described below with reference to FIG. 6.

Figure 6:
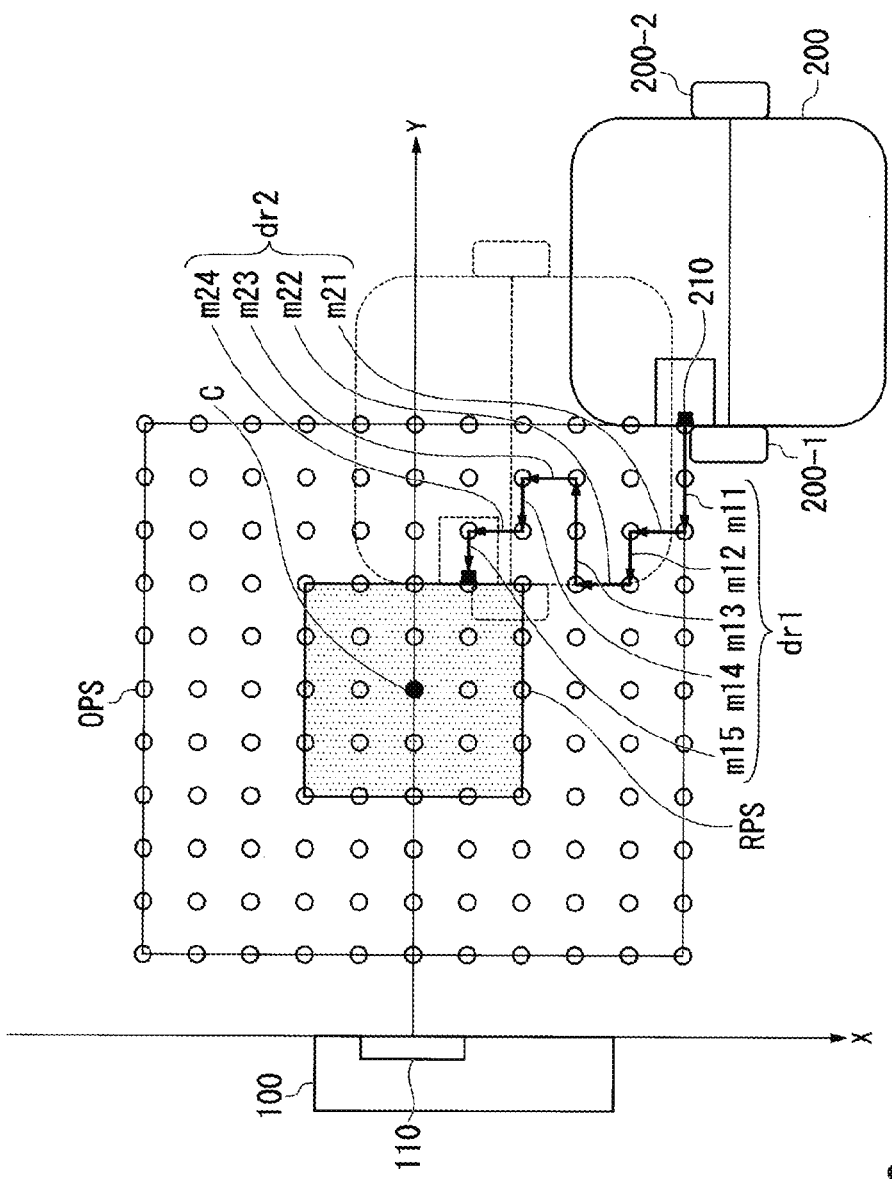
FIG. 6 is a first diagram showing an example of movement control of a mobile body of an exemplary embodiment of the present disclosure.

FIG. 6 is a first diagram showing the example of the movement control of the mobile body 200 of this embodiment.

In a case where the power reception status information R indicates that the power reception status is not fine, the mobile body 200 moves away from a current position along a predetermined movement axis. Here, the case where the power reception status information R indicates that the power reception status is not fine is a case where the actual power reception efficiency is lower than the target value of the power reception efficiency of the mobile body 200.

Here, a description will be given of a case where the direction on the x-axis of the mobile body 200 and the direction on the X-axis of the non-contact power supply device 100 coincide with each other, that is, when the power transmission surface of the power transmission resonator 110 of the non-contact power supply device 100 and the power reception surface of the power reception resonator 210 of the mobile body 200 are parallel to each other. In this case, the mobile body 200 moves in a direction dr1 which is a direction along the x-axis. Moreover, the mobile body 200 moves in a direction dr2 which is a direction along the y-axis. The axis indicating the direction dr1 represents an example of a first movement axis. Meanwhile, the axis indicating the direction dr2 represents an example of a second movement axis. In this example, the mobile body 200 moves along the first movement axis and the second movement axis which have axial directions that are different from each other. Here, if the power transmission surface of the power transmission resonator 110 and the power reception surface of the power reception resonator 210 are parallel to each other, then the direction dr1 is the direction along the X-axis while the direction dr2 is the direction along the Y-axis.

The mobile body 200 repeats the movement in the direction dr1 and the movement in the direction dr2 alternately based on the power reception status information R. The mobile body 200 updates the power reception status information R every time the mobile body 200 changes its position, and searches for a position where the power reception status is fine based on the updated power reception status information R. As a consequence, the mobile body 200 moves to the position where the power reception status is fine, that is, the position in the power supply range RPS. As shown in FIG. 6, in this example, the mobile body 200 alternately repeats marking of a movement trail m11, a movement trail m12, . . . , and a movement trail m15 in the direction dr1, and a movement trail m21, a movement trail m22, . . . , and a movement trail m24 in the direction dr2, thus moving into the power supply range RPS.

In other words, when the mobile body 200 makes a stop in the power supply target range OPS, the mobile body 200 moves in the direction of the first movement axis at least once and moves in the direction of the second movement axis at least once.

Here, the mobile body 200 possesses inertia that is attributable to its own weight as well as the weight of the conveyance target item, and may therefore not always be able to make a stop at an accurate target position when the mobile body 200 performs control to make a stop in the power supply target range OPS. In other words, even when the mobile body 200 makes a stop in the power supply target range OPS, the mobile body 200 may not be able to make a stop at a position where the power reception status is fine. If the mobile body 200 continues the power reception in the state where the power reception status is not fine, the mobile body 200 may require a long time until an amount of power reception reaches a target value. In this case, efficiency of conveyance by the mobile body 200 may be deteriorated.

The mobile body 200 of this embodiment searches for the position where the power reception status is fine in the case where the power reception status is not fine when the mobile body 200 makes a stop in the power supply target range OPS. Accordingly, the mobile body 200 of this embodiment can enhance the power supply efficiency. In addition, the mobile body 200 of this embodiment can move to the position where the power reception status is fine even when the mobile body 200 does not grasp the position of the non-contact power supply device 100.

Figure 7:
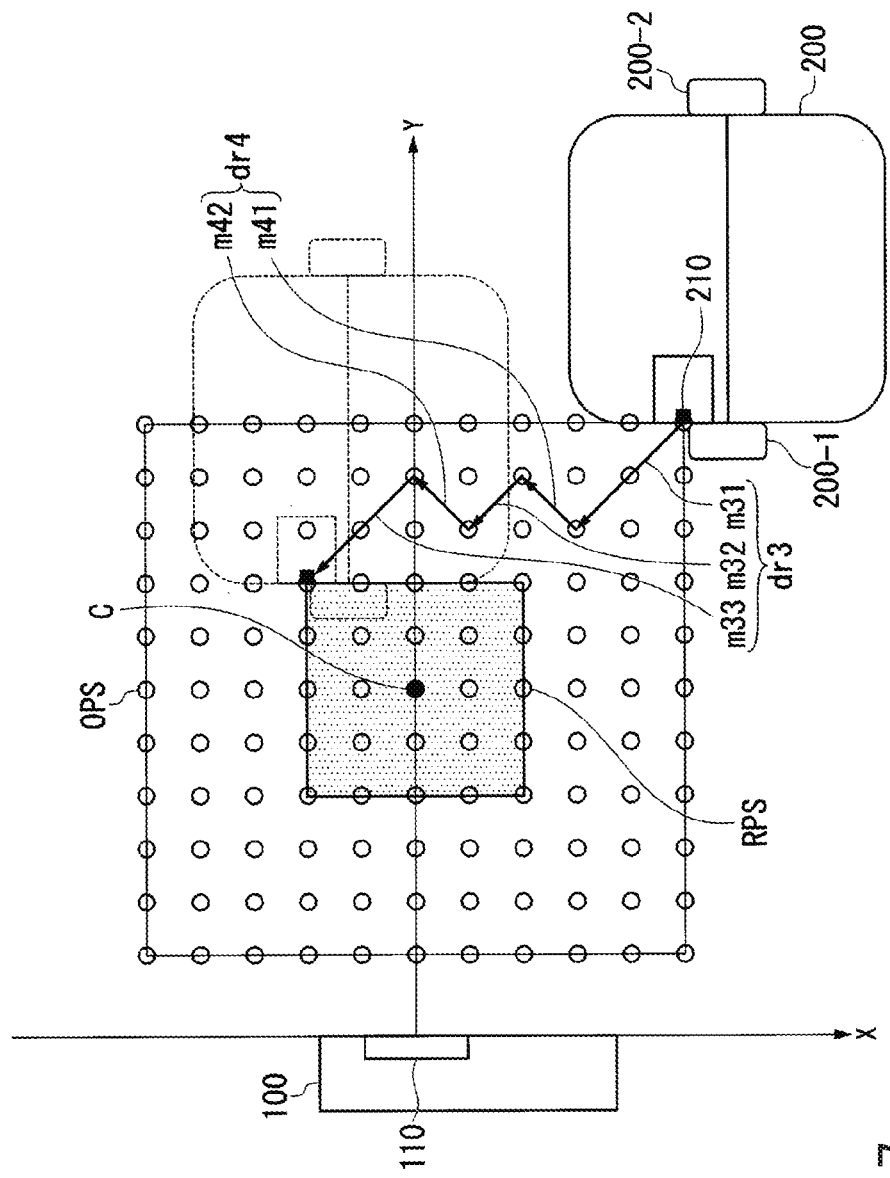
FIG. 7 is a second diagram showing an example of the movement control of a mobile body of an exemplary embodiment of the present disclosure.

Another example of the movement control of the mobile body 200 will be described below with reference to FIG. 7. FIG. 7 is a second diagram showing an example of the movement control of the mobile body 200 of this embodiment. In the case where the power reception status information R indicates that the power reception status is not fine, the mobile body 200 moves in a direction which is a combination of the x-axis and the y-axis. That is to say, in the case of this movement example, the mobile body 200 is capable of moving in obliquely forward and backward directions relative to the x-axis or the y-axis. Specifically, the mobile body 200 moves in a direction dr3 which combines the negative direction on the x-axis with the negative direction on the y-axis and in a direction dr4 which combines the negative direction on the x-axis with the positive direction on the y-axis. The axis indicating the direction dr3 represents another example of the first movement axis. Meanwhile, the axis indicating the direction dr4 represents another example of the second movement axis. The mobile body 200 repeats the movement in the direction dr3 and the movement in the direction dr4 based on the power reception status information R, thus moving into the power supply range RPS. As shown in FIG. 7, in this example, the mobile body 200 alternately repeats marking of a movement trail m31, a movement trail m32, and a movement trail m33 in the direction dr3, and a movement trail m41 and a movement trail m42 in the direction dr4, thus moving into the power supply range RPS. In other words, when the mobile body 200 makes a stop in the power supply target range OPS, the mobile body 200 moves in the direction of the first movement axis at least once and moves in the direction of the second movement axis at least once.

The mobile body 200 not only moves in the x-axis direction and the y-axis direction, that is, forward and backward as well as rightward and leftward, but also moves in the directions which combine the x-axis and the y-axis, that is, in the obliquely forward and backward directions. By moving in the obliquely forward and backward directions relative to the x-axis or the y-axis, the mobile body 200 can reduce time for searching for the position with the fine power reception status as compared to the case of moving only forward and backward as well as rightward and leftward.

Figure 8A:
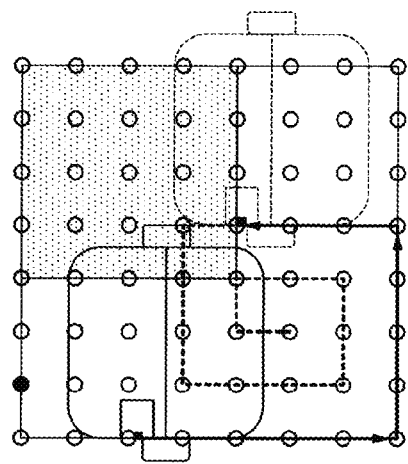
FIGS. 8A to 8D are diagrams showing an example of movement control in a case where a mobile body of an exemplary embodiment of the present disclosure moves spirally to the power supply range.
Figure 8B:
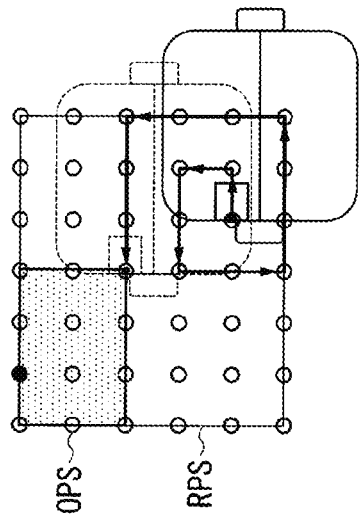
Figure 8C:
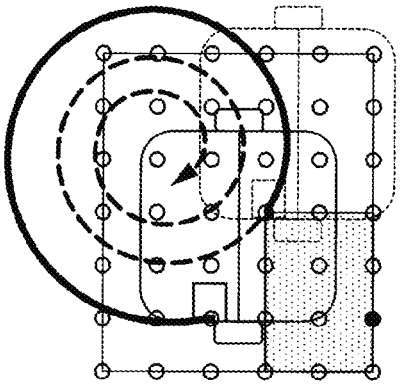
Figure 8D:
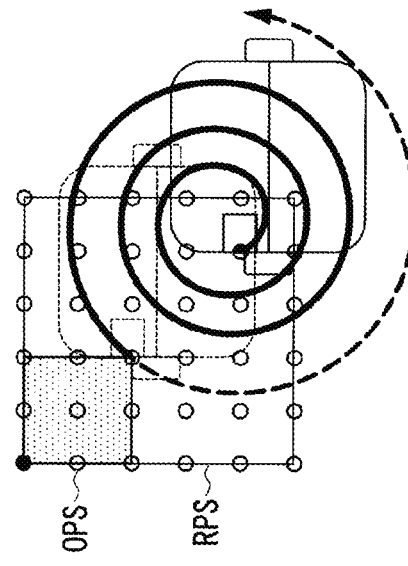

An example of movement control to locate the mobile body 200 in the power supply range RPS based on the power reception status information R will be described with reference to FIGS. 8A to 8D. FIGS. 8A to 8D are diagrams showing an example of movement control in a case where the mobile body 200 of this embodiment moves spirally to the power supply range RPS. Here, the spiral movement means an action of the mobile body 200 to alternately repeat movement in the direction dr1 or the opposite direction thereto and movement in the direction dr2 or the opposite direction thereto. To be more precise, the spiral movement means iteration of movement by the mobile body 200 in the order of the movement in the direction dr1, the movement in the direction dr2, the movement in the opposite direction to the direction dr1, and the movement in the opposite direction to the direction dr2. There are two types of the spiral movement, namely, the movement from the inside to the outside of the spiral and the movement from the outside to the inside of the spiral. Here, the movement from the inside to the outside of the spiral is movement in such a direction that a movement distance for each side of the spiral becomes gradually longer as the movement progresses. On the other hand, the movement from the outside to the inside of the spiral is movement in such a direction that a movement distance for each side of the spiral becomes gradually shorter as the movement progresses. FIGS. 8A and 8B are diagrams showing an example in which the mobile body 200 spirally moves to the power supply range RPS by alternately repeating the movement in the directions indicated with the direction dr1 and the direction dr2 based on the power reception status information R. In the meantime, FIGS. 8C and 8D are diagrams showing an example in which the mobile body 200 spirally moves to the power supply range RPS by alternately repeating the movement in the directions indicated with the direction dr3 and the direction dr4 based on the power reception status information R. Specifically, the mobile body 200 spirally moves in the direction from the inside to the outside of the power supply target range OPS.

In the case of an example shown in FIGS. 8A and 8C, the mobile body 200 moves in a direction from a current position to the outside of the power supply target range OPS. In this case, the mobile body 200 spirally moves from a range close to the current position gradually to a range far from the current position. For example, there may be a case where a distance is short from the current position of the mobile body 200 to the power supply range RPS. In this case, the mobile body 200 can reduce the time for searching for the position with the fine power reception status by moving in the direction from the current position gradually to the outside.

Meanwhile, in the case of an example shown in FIGS. 8B and 8D, the mobile body 200 moves in a direction from the current position to the inside of the power supply target range OPS. In this case, the mobile body 200 moves for a long distance from the current position along an outside diameter of the spiral and then moves gradually for a shorter distance to the inside of the spiral. For example, there may be a case where the distance is long from the current position of the mobile body 200 to the power supply range RPS. In this case, the mobile body 200 can reduce the time for searching for the position with the fine power reception status by moving for a long distance along the outside diameter of the spiral.

Figure 9:
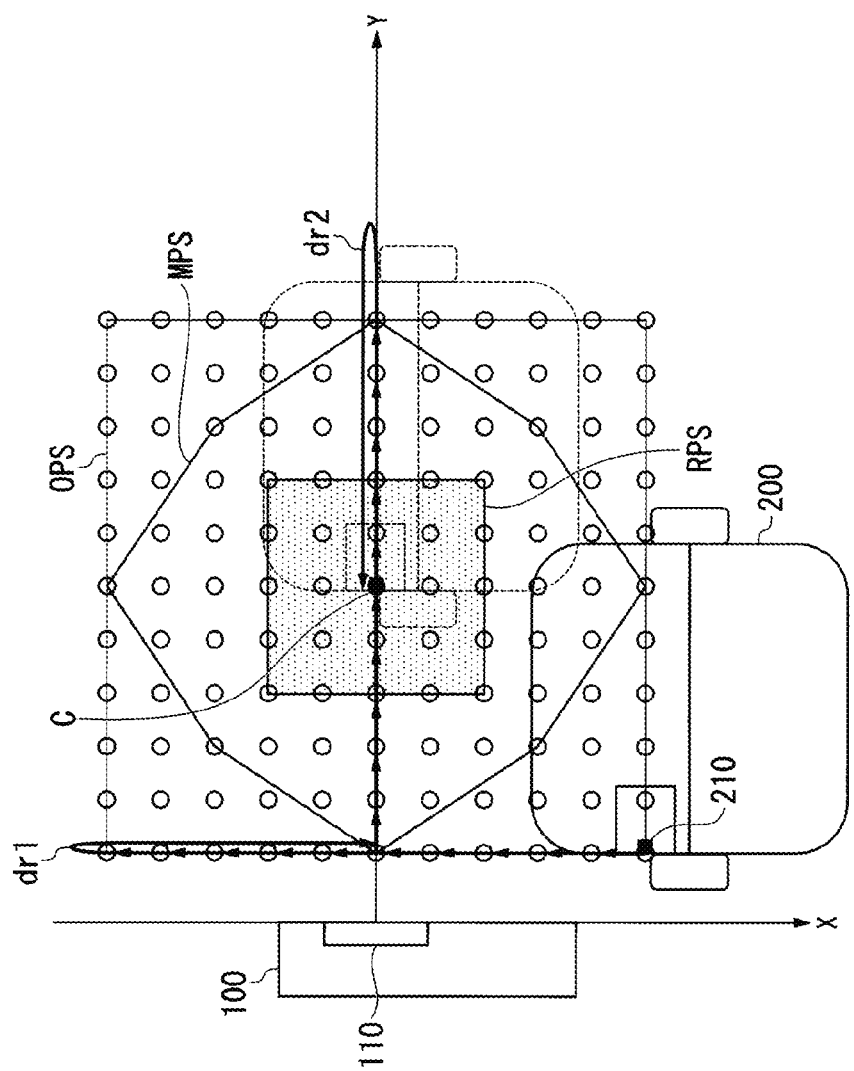
FIG. 9 is a diagram showing an example of the movement control in a case where a mobile body of an exemplary embodiment of the present disclosure performs sweeping.

Another example of the movement control to locate the mobile body 200 in the power supply range RPS based on the power reception status information R will be described with reference to FIG. 9. FIG. 9 is a diagram showing an example of the movement control in a case where the mobile body 200 of this embodiment performs sweeping. The sweeping means an act of searching for a position in the power supply target range OPS where the power reception status is fine by causing the mobile body 200 to scan in two directions. In this example, the sweeping is an act of searching for the position in the power supply target range OPS where the power reception status is fine by scanning in a certain direction and in a different direction from the certain direction. Here, the "certain direction" is the direction dr1, for example. Meanwhile, the "different direction from the certain direction" is the direction dr2, for example. That is to say, in this example, the mobile body 200 sweeps in the direction dr1 that is the direction along the x-axis and in the direction dr2 that is the direction along the y-axis.

Although the description has been given of the case where the certain direction is the direction dr1 while the different direction from the certain direction is the direction dr2, the present disclosure is not limited to this configuration. For instance, the certain direction may be the direction dr3 and the different direction from the certain direction may be the direction dr4. Here, the certain direction represents an example of a direction along the first movement axis. Meanwhile, the different direction from the certain direction represents an example of a direction along the second movement axis.

Moreover, in this example, the power reception status shown in the power reception status information R is indicated by using a three-tier scale. Specifically, the power reception status is indicated in the power reception status information R by using any of three tiers of "high", "medium", and "low". When the power reception status information R shows "high", the information indicates that the power reception status of the mobile body 200 is fine. When the power reception status information R shows "medium", the information indicates that the power reception status of the mobile body 200 is somewhere between fine and not fine. When the power reception status information R shows "low", the information indicates that the power reception status of the mobile body 200 is not fine. In the example shown in FIG. 9, the power supply range RPS and a power supply allowable range MPS are included in the power supply target range OPS. Here, the power supply range RPS is a range where the power reception status information R shows "high". Meanwhile, the power supply allowable range MPS is a range where the power reception status information R shows "medium". In the meantime, of the power supply target range OPS, a range other than the power supply range RPS and the power supply allowable range MPS is a range where the power reception status information R shows "low".

The mobile body 200 sweeps in the direction dr1 from a certain position in the power supply target range OPS to an end point where the power reception status information R shows "low". Moreover, based on a result of scanning the power reception status in the direction dr1, the mobile body 200 moves to a position where the power reception status information R shows a tier other than "low". In the example shown in FIG. 9, the mobile body 200 moves to a position in the direction dr1 where the power reception status information R shows "middle". The mobile body 200 sweeps in the direction dr2 from the position where the power reception status information R shows the tier other than "low". The mobile body 200 sweeps in the direction dr2 to an end point where the power reception status information R shows "low". The mobile body 200 moves to a position in the direction dr2 before moving to the end point where the power reception status information R shows "low", the position having the fine power reception status. In the example shown in FIG. 9, the mobile body 200 moves in the direction dr2 to a position where the power reception status information R shows "high".

Here, the mobile body 200 sweeps in the direction dr1, thereby scanning for a location in the direction dr1 with the fine power reception status. Moreover, the mobile body 200 scans for a location in the direction dr2 with the fine power reception status based on the power reception status information R at the time of sweeping in the direction dr1. In other words, the mobile body 200 moves in the direction of the second movement axis based on the power reception status information R obtained as a result of the movement in the direction of the first movement axis. That is to say, when the mobile body 200 makes a stop in the power supply target range OPS, the mobile body 200 moves in the direction of the first movement axis at least once and moves in the direction of the second movement axis at least once. In this way, the mobile body 200 can move to the position with the fine power reception status by sweeping along the first movement axis and the second movement axis.

Although the description has been given of the case where the power reception status is indicated by using a three-tier scale, the present disclosure is not limited to this configuration. The power reception status may be indicated with the degree of accuracy that applies three or more tiers. Alternatively, the power reception status may be indicated with a continuous volume. In this case, the power reception status may be segmented by using at least two thresholds and indicated with the degree of accuracy that applies at least three tiers.

Figure 10:
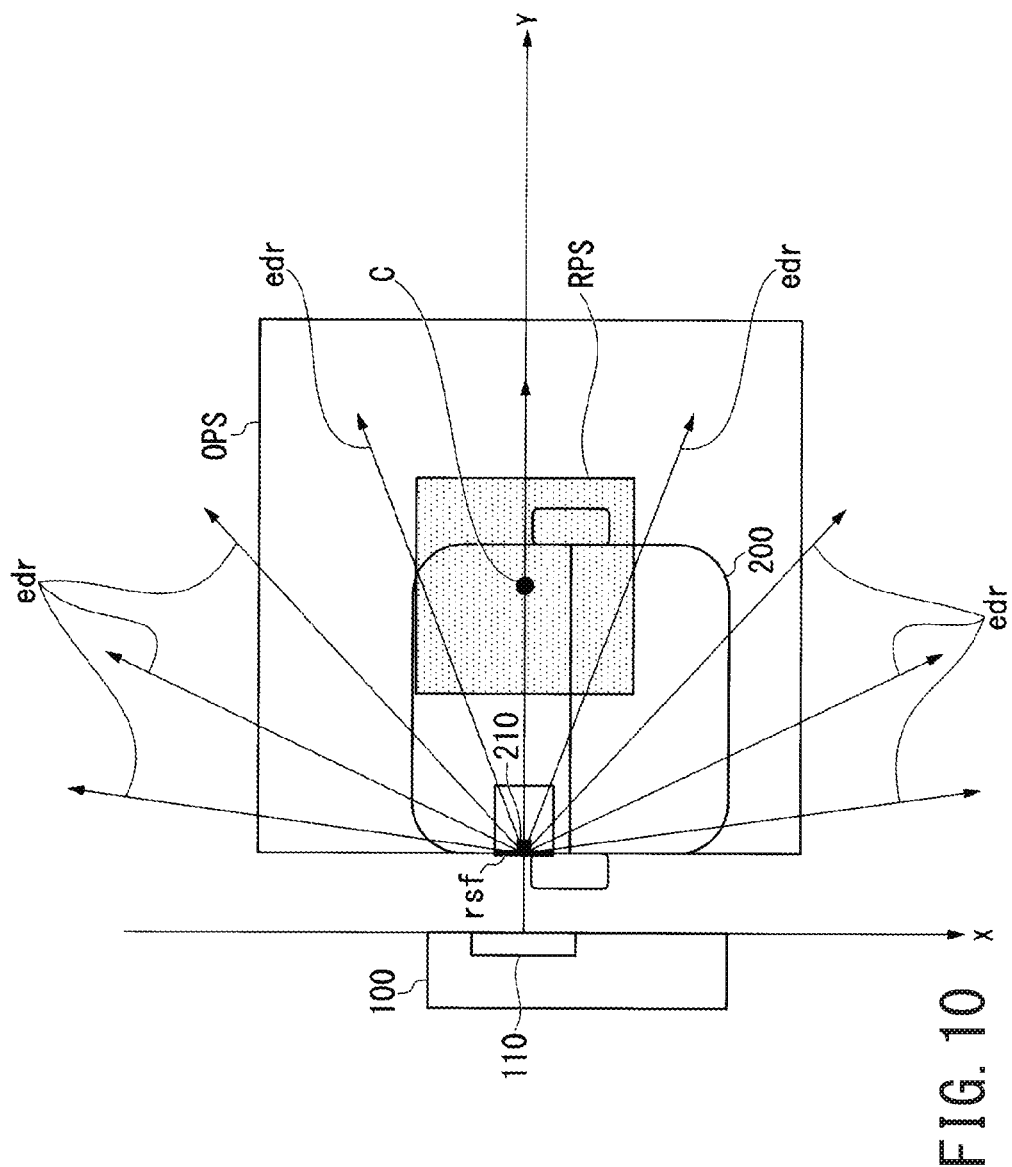
FIG. 10 is a diagram showing an example of the movement control in a case where a mobile body of an exemplary embodiment of the present disclosure moves in a receding direction from the power transmission resonator.

An example of the movement control by which the mobile body 200 moves in a receding direction edr that is a direction to move away from the power transmission resonator 110 will be described with reference to FIG. 10. FIG. 10 is a diagram showing an example of the movement control in a case where the mobile body 200 of this embodiment moves in the receding direction edr from the power transmission resonator 110. Each receding direction edr therein is a direction of power transmission from the power transmission resonator 110. In other words, the receding direction edr is a direction of power reception by a power reception surface rsf of the power reception resonator 210, which is a surface configured to receive the power. As described previously, in this example, the power transmission resonator 110 provided to the non-contact power supply device 100 transmits the power in the direction of the Y-axis from the position of the power transmission resonator 110. In this case, the receding direction edr is a direction containing a component in the Y-axis direction.

For example, the mobile body 200 may be located at a position in a range close to the power transmission resonator 110, where the power reception status information R indicates that the power reception status is not fine. In the meantime, as described previously, there may be a case where the power transmission surface of the power transmission resonator 110 of the non-contact power supply device 100 is installed perpendicular to the floor surface, or in other words, to the XY-plane. In this case, the mobile body 200 may collide with the power transmission resonator 110 if the mobile body 200 moves in the direction to approach the power transmission resonator 110. When the power transmission surface of the power transmission resonator 110 of the non-contact power supply device 100 is installed perpendicular to the floor surface, the mobile body 200 may encounter the case where the power reception status information R indicates that the power reception status it not fine. In this case, the mobile body 200 moves in the receding direction edr to suppress a collision with the power transmission resonator 110. Thus, it is possible to suppress breakage and failure due to the collision of the mobile body 200 and the non-contact power supply device 100.

Now, the rotational movement of the mobile body 200 will be described below. There may be a case where the mobile body 200 fails to make a stop at a position where the power reception surface of the power reception resonator 210 is parallel to the power transmission surface of the power transmission resonator 110. This case may be attributable to a difference in friction coefficient between the two wheels of the mobile body 200, or to the occurrence of a variation in timing to stop between the two wheels. Here, the power reception status indicated by the power reception status information R varies depending on an angle of opposition of the power transmission resonator 110 to the power reception resonator 210. For example, the power reception status indicated by the power reception status information R is fine when the power reception surface rsf of the power reception resonator 210 is orthogonal to the direction of the power transmission from the power transmission resonator 110. In other words, the power reception status of the mobile body 200 is fine when the mobile body 200 makes a stop at a position where the power reception surface of the power reception resonator 210 is parallel to the power transmission surface of the power transmission resonator 110. On the other hand, the power reception status indicated by the power reception status information R is not fine when the power reception surface rsf of the power reception resonator 210 is parallel to the direction of the power transmission from the power transmission resonator 110. In other words, the power reception status of the mobile body 200 is not fine when the mobile body 200 makes a stop at a position where the power reception surface of the power reception resonator 210 is not parallel to the power transmission surface of the power transmission resonator 110. As a consequence, in order to efficiently receive the power transmitted from the power transmission resonator 110, the mobile body 200 may be required to adjust an angle of the power reception surface rsf relative to the power transmission surface of the power transmission resonator 110.

Figure 11A:
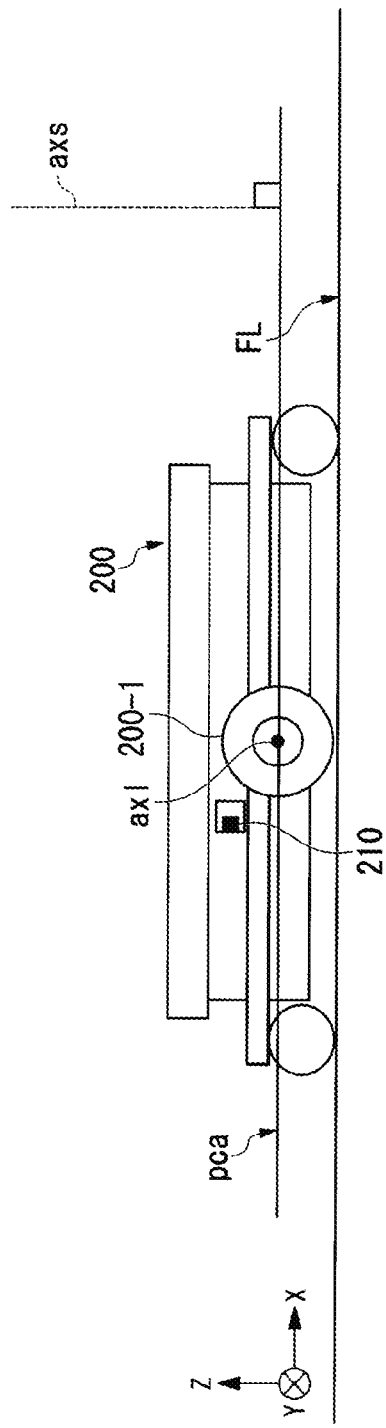
FIGS. 11A and 11B are diagrams showing an example of a rotation axis serving as the basis of rotational movement of a mobile body of an exemplary embodiment of the present disclosure.
Figure 11B:
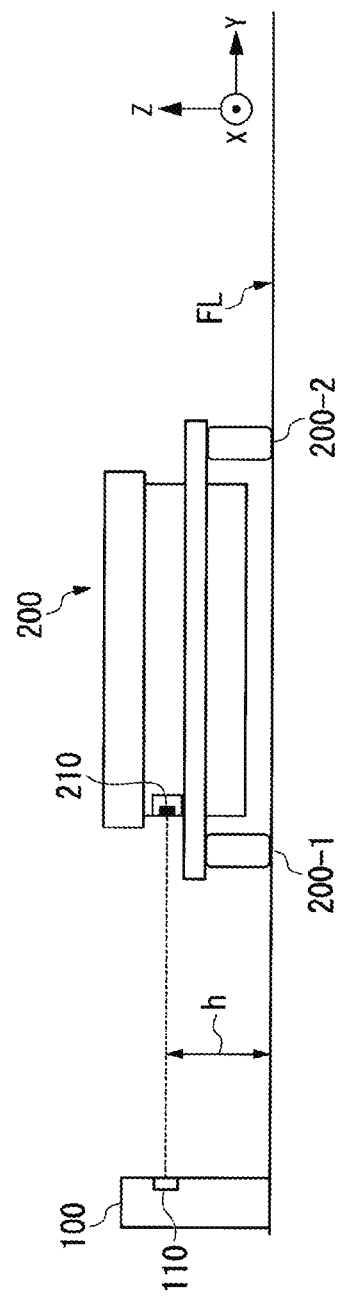

A specific example of the rotation axis serving as the basis of the rotational movement of the mobile body 200 will be described with reference to FIGS. 11A and 11B. FIGS. 11A and 11B are diagrams showing an example of the rotation axis serving as the basis of the rotational movement of the mobile body 200 of this embodiment. Specifically, FIG. 11A is a side view showing a layout example of the mobile body 200. Meanwhile, FIG. 11B is a rear view showing the layout example of the mobile body 200.

The mobile body 200 performs the rotational movement based on a certain rotation axis axs. The rotation axis axs is an axis orthogonal to an axle plane pca which is a plane including the axle axl of the wheels 202. By means of rotation based on the rotation axis axs, the mobile body 200 can be rotated on the plane including the axle axl of the wheels 202. Moreover, in this example, a height h in the vertical direction from a floor surface FL to the power transmission resonator 110 is equal to a height h in the vertical direction from the floor surface FL to the power reception resonator 210. Here, if the power reception resonator 210 is located at a height in terms of the height in the vertical direction from the floor surface FL, which corresponds to the height of the power transmission resonator 110, then the mobile body 200 can change the power reception status by performing the movement or the rotational movement without requiring any movement in the Z-axis direction.

Although the description has been given of the case where the wheels 202 have the single axle axl, the present disclosure is not limited to this configuration. For example, there is a case where the mobile body 200 includes the wheels 202 having different diameters from each other. In this case, the rotation axis axs may be an axis that is orthogonal to the axle plane pca that includes the axle axl of any of the wheels 202 provided to the mobile body 200, which is the wheel 202 used for the rotation.

Meanwhile, although the description has been given of the case where the power transmission resonator 110 transmits the power in the Y-axis direction parallel to the floor surface FL, the present disclosure is not limited to this configuration. The power transmission resonator 110 may transmit the power in any direction as long as such a direction includes the direction parallel to the floor surface FL. For example, the power transmission resonator 110 may transmit the power in any direction as long as that direction is a direction other than the Z-axis direction being orthogonal to the floor surface FL in which the power transmission resonator 110 is installed. In this case, the mobile body 200 can be rotated in such a way as to change the angle of opposition of the power transmission resonator 110 to the power reception resonator 210, thereby changing the power reception status.

Now, a more specific example of the rotation axis serving as the basis of the rotational movement of the mobile body 200 will be described with reference to FIGS. 12A and 12B. FIGS. 12A and 12B are diagrams showing an example of a layout of the power reception surface rsf and the rotation axis axs of the mobile body 200 of this embodiment. Specifically, FIG. 12A shows a rotation axis axsF which is the rotation axis axs located on the non-installed side of the power transmission resonator 110 based on the position of the power reception surface rsf. Meanwhile, FIG. 12B shows a rotation axis axsN which is the rotation axis axs located on the installed side of the power transmission resonator 110 based on the position of the power reception surface rsf.

In the example shown in FIG. 12A, the position of the power reception resonator 210 is changed as a consequence of the rotational movement of the mobile body 200 based on the rotation axis axsF. Along with the rotational movement of the mobile body 200 and the movement of the power reception resonator 210, the angle of opposition of the power transmission resonator 110 to the power reception resonator 210 is changed and the power reception status is changed accordingly. As a consequence, the mobile body 200 can detect a direction of installation of the power transmission resonator 110 by performing the rotational movement based on the power reception status information R in such a direction that can bring about the fine power reception status.

In the example shown in FIG. 12B, the position of the power reception resonator 210 is changed as a consequence of the rotational movement of the mobile body 200 based on the rotation axis axsN. Along with the rotational movement of the mobile body 200 and the movement of the power reception resonator 210, the angle of opposition of the power transmission resonator 110 to the power reception resonator 210 is changed and the power reception status is changed accordingly. As a consequence, the mobile body 200 can detect a direction of installation of the power transmission resonator 110 by performing the rotational movement based on the power reception status information R in such a direction that can bring about the fine power reception status.

Although the description has been given of the case where the mobile body 200 performs the rotational movement based on either the rotation axis axsF or the rotation axis axsN, the present disclosure is not limited to this configuration. The mobile body 200 may perform the rotational movement based on both the rotation axis axsF and the rotation axis axsN. For example, the mobile body 200 performs the rotational movement based on the rotation axis axsF and detects the direction of installation of the power transmission resonator 110. Meanwhile, the mobile body 200 may perform the rotational movement based on the rotation axis axsF and then perform the rotational movement based on the rotation axis axsN. The series of the rotational movement enables the mobile body 200 to change the angle of opposition of the power transmission resonator 110 to the power reception resonator 210. In this way, the mobile body 200 can perform the rotational movement in such a direction to obtain the fine power reception status at the current position. Here, the rotation axis axsF represents an example of a first rotation axis. Meanwhile, the rotation axis axsN represents an example of a second rotation axis. Moreover, in this case, the second rotation axis is a rotation axis to be located at a position away in an opposite direction to the direction indicated with a power-receiving direction from the position of the first rotation axis.

Although the description has been given of the case where the power reception resonator 210 is located on the side surface of the mobile body 200, the present disclosure is not limited to this configuration. For example, when a side surface of the mobile body 200 has an opening, the power reception resonator 210 may be located inside the opening.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A mobile body to be driven by power that is wirelessly transferred from a non-contact power supply device including a power transmission resonator to transmit the power in accordance with a non-contact power supply method, the mobile body comprising:
    a power reception resonator to receive the power transmitted from the power transmission resonator;
    a power storage to store the power received by the power reception resonator;
    a motor to be operated by the power stored in the power storage;
    a controller configured or programmed to control driving of the motor; and
    at least two wheels to be driven independently of each other by the motor, the at least two wheels including a first movement axis and a second movement axis with an axial orientation being different from an axial orientation of the first movement axis, and moving the mobile body along the first movement axis and the second movement axis; wherein
    the at least two wheels are movable on a floor surface; and
    when the mobile body moves to a power supply target range, the controller controls the motor based on power reception status information indicating a status of power reception by the power reception resonator, and moves the mobile body in a flat plane direction.

2. The mobile body according to claim 1, wherein when the mobile body moves in the power supply target range, the mobile body moves in a direction of the first movement axis at least once and moves in a direction of the second movement axis at least once.

3. The mobile body according to claim 1, wherein when the mobile body moves in the power supply target range, the mobile body moves in a direction combining a direction of the first movement axis with a direction of the second movement axis.

4. The mobile body according to claim 1, wherein the mobile body moves spirally when the power reception status information indicates that the status of power reception by the power reception resonator is not acceptable.

5. The mobile body according to claim 4, wherein the mobile body moves spirally in a direction from inside to outside of the power supply target range.

6. The mobile body according to claim 1, wherein
    the power reception status information indicates a quality of the reception of the power transmitted from the power transmission resonator and received by the power reception resonator by using one of at least three tiers; and
    the mobile body moves in a direction of the second movement axis based on the power reception status information obtained as a consequence of movement in a direction of the first movement axis.

7. The mobile body according to claim 1, wherein when the power reception status information indicates that the status of power reception by the power reception resonator is not acceptable, the mobile body moves in a power receiving direction which contains a component parallel or substantially parallel to the floor surface, the power receiving direction being selected from directions of reception of the power transmitted from the power transmission resonator by the power reception resonator, and being a direction receding from the power transmission resonator.

8. The mobile body according to claim 1, wherein the controller rotationally moves the mobile body based on a rotation axis extending in a perpendicular or substantially perpendicular direction to a plane parallel or substantially parallel to the floor surface and including an axle of the wheels, the rotation axis being a center of rotational movement with which an angle of opposition of the power transmission resonator to the power reception resonator is made variable.

9. The mobile body according to claim 8, wherein
    a position of the rotation axis is determined based on a power receiving direction which contains a component parallel or substantially parallel to the floor surface, the power receiving direction being selected from directions of reception of the power transmitted from the power transmission resonator by the power reception resonator; and
    the controller rotationally moves the mobile body based on the rotation axis.

10. The mobile body according to claim 9, wherein
    the position of the rotation axis is determined at a position spaced away in the power receiving direction from a power reception surface of the power reception resonator; and
    the controller rotationally moves the mobile body based on the rotation axis.

11. The mobile body according to claim 9, wherein
    the rotation axis includes a first rotation axis and a second rotation axis;

a position of the first rotation axis is determined at a position spaced away in the power receiving direction from a power reception surface of the power reception resonator;

a position of the second rotation axis is determined at a position spaced away from the position of the first rotation axis in an opposite direction to the power receiving direction; and the controller rotates the mobile body based on the second rotation axis and based on the power reception status information obtained as a result of rotationally moving the mobile body based on the first rotation axis.

12. The mobile body according to claim 1, wherein the power reception resonator is located at a height corresponding to a height in a vertical direction of the power transmission resonator in terms of a height of the mobile body in the vertical direction from the floor surface.

13. A mobile body system comprising:

the mobile body according to claim 1; and a non-contact power supply device; wherein the non-contact power supply device includes:

the power transmission resonator to transmit the power in accordance with the non-contact power supply method;

a power transmission communication circuit to receive information concerning supply of the power; and a transmission power control circuit to control the power supply by the power transmission resonator based on the information concerning the supply of the power, the information being received by the transmission power control circuit.

* * * * *